A. Rank.
Mower.

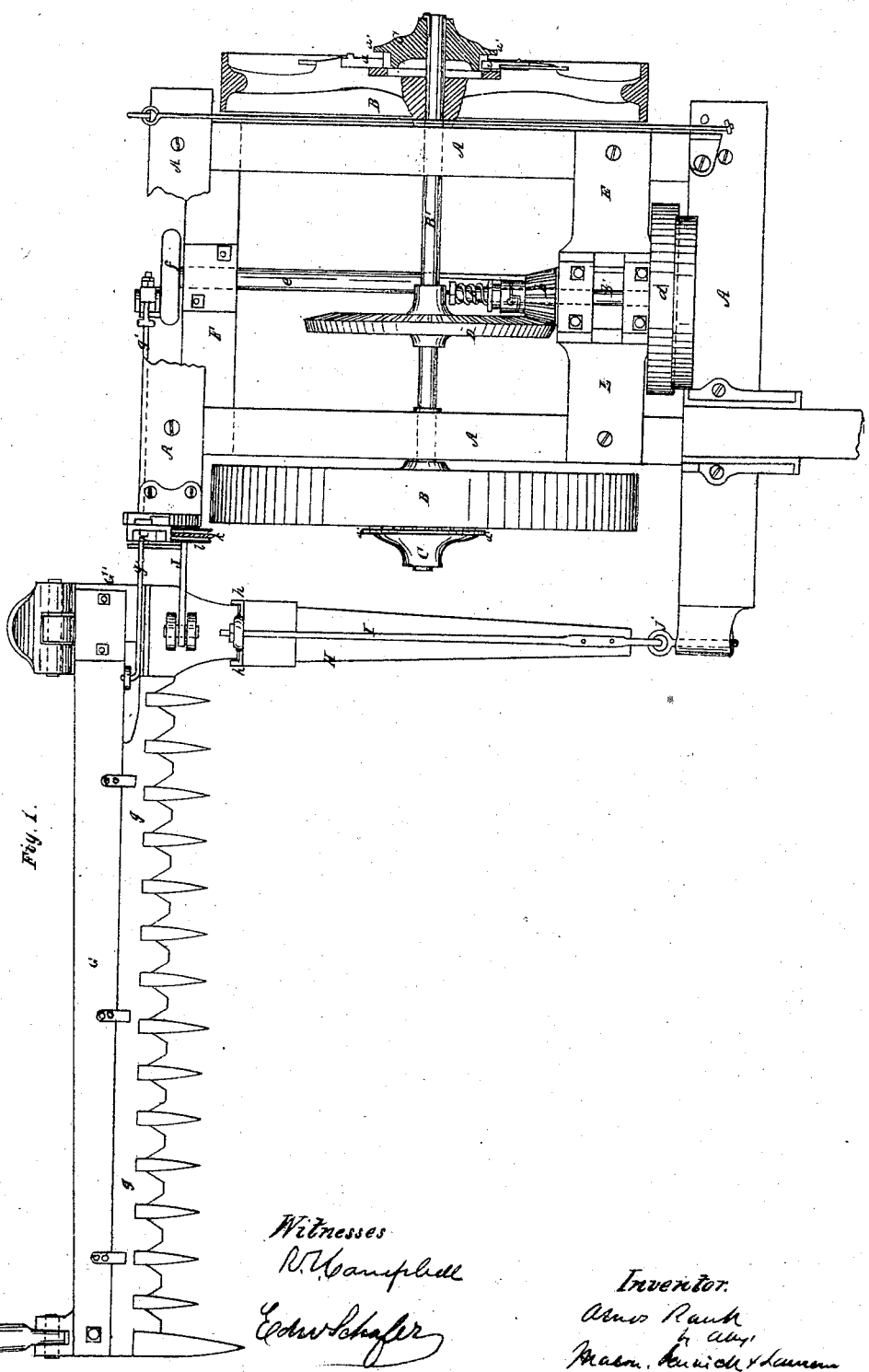

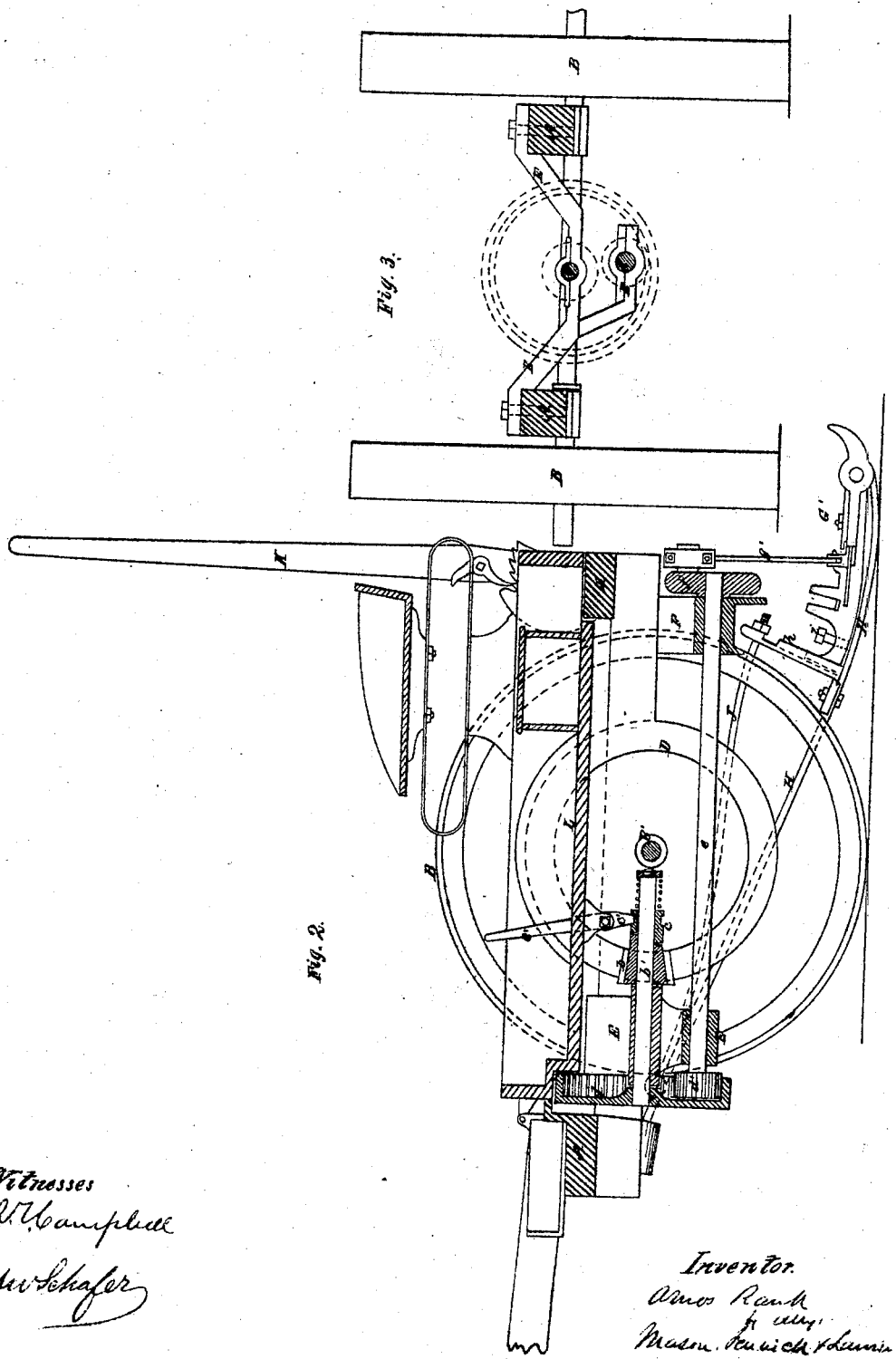

N° 55905.  Patented Jun. 26, 1866.

Sheet 3.
3 Sheets.

UNITED STATES PATENT OFFICE.

AMOS RANK, OF SALEM, OHIO.

IMPROVEMENT IN MOWING-MACHINES.

Specification forming part of Letters Patent No. 55,905, dated June 26, 1866.

*To all whom it may concern:*

Be it known that I, AMOS RANK, of Salem, in the county of Columbiana and State of Ohio, have invented certain novel Improvements in Reaping and Mowing Machines; and I do hereby declare that the following is a full, clear, and exact description thereof, reference being had to the accompanying drawings, making a part of this specification, in which—

Figure 5:
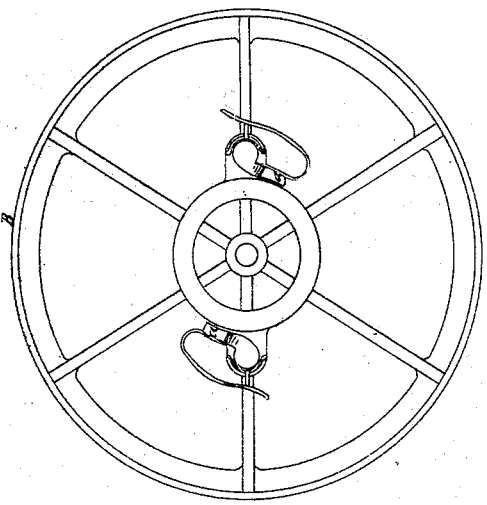
Figure 6:
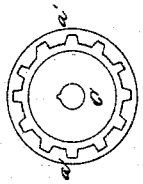
Figure 4:
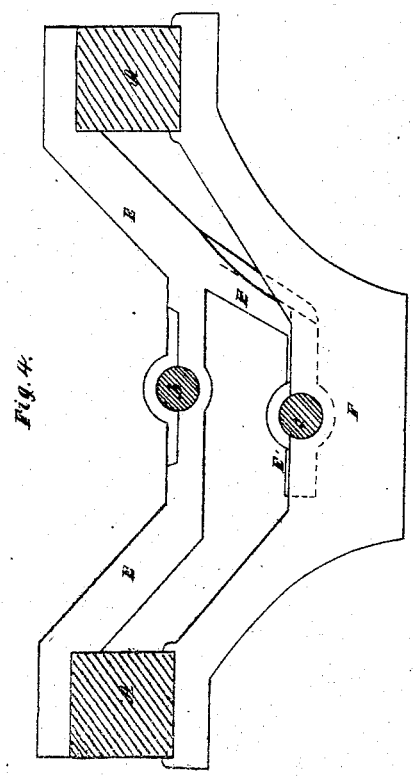

Figure 1 is a plan view of a reaping-machine having my invention applied to it. Fig. 2 is a longitudinal section taken vertically through the center of my machine. Fig. 3 is a front sectional view, showing the front hanger-bearing. Fig. 4 is a rear view, showing the front and rear bearings for the driving-shafts. Fig. 5 is an outside view of one of the transporting-wheels with its ratchet-nut removed. Fig. 6 is an inside view of the ratchet-nut.

Similar letters of reference indicate corresponding parts in the several figures.

This invention consists in the employment of a metallic hanging bearing, in conjunction with a wooden draft-frame, for sustaining the forward ends of two shafts which are used for transmitting motion to the sickle from the axle of the transporting-wheels, said hanging bearing being constructed with two journal-boxes and sustained on top of the draft-frame beams, as will be hereinafter described.

It also consists in the employment of toothed ratchet nuts or caps upon an axle carrying the transporting-wheels, said nuts being keyed upon said axle and adapted to serve, in conjunction with pawls, as a means for engaging the said wheels with their axle when the machine is drawn forward, and to disengage the wheels when the machine is backed, as will be hereinafter described.

To enable others skilled in the art to understand my invention, I will describe its construction and operation.

In the accompanying drawings, A represents a rectangular frame which is composed of two longitudinal wooden beams and two transverse wooden beams. This frame A is mounted upon two transporting-wheels, B B, which are placed loosely upon an axle, B', that is allowed to turn freely in its bearings beneath the longitudinal beams of the frame. The wheels B B are caused to turn their axle when the machine is moved forward, but when it is moved backward the wheels turn loosely upon their axle. This is effected by means of circular dished nuts C C, which have teeth formed on their circumference, and which are keyed on the outer ends of the axle B', so as to be acted upon by pawls *a a* on the spokes of the wheels B B. When the wheels are turned in one direction the spring-pawls *a a* will engage with the teeth on the nuts or caps C C, and turn the axle B'. When the wheels are turned in an opposite direction the pawls *a a* will play loosely on the nuts C, and the axle will not be turned. The nuts C are constructed with flanges *a'*, for keeping the pawls in place, and these nuts are dished, as shown in Fig. 1, so as to serve as caps for the hubs of their respective wheels.

A large bevel spur-wheel, D, is keyed on the axle B' and engages with a pinion spur-wheel, *b*, which will turn loosely upon a short longitudinal shaft, *b'*, in front of the axle B', as shown in Figs. 1 and 2. This bevel-wheel *b* is caused to engage with and rotate its shaft *b'* by means of a spring-clutch, *c*, having a groove in it to receive the end of a vibrating lever, *c'*. The spring which acts upon that part of the clutch lettered *c*, and which has the annular slot in it, keeps it up against that part of the clutch which is on the spur-wheel *b*, and in this manner the shaft *b'* will be rotated by the spur-wheels above described. By pressing the upper end of lever *c'* forward the wheel *b* will turn loosely on its shaft, or, should the machine be backed and the pawls *a a* not cease to act upon their ratchet-nuts C C from any extraordinary cause, the clutch *c* will be disengaged from the wheel *b*.

The shaft *b'* is supported in two bearing-boxes which are formed on a depressed stirrup or hanger, E, that extends transversely across the frame A, and is sustained at its extremities on top of the longitudinal beam of this frame, as shown in Figs. 1, 2, 3, and 4. On the front end of the shaft *b'* a large inside-gear wheel, *d*, is keyed, the front side of which is closed, as shown in Fig. 2, so that it forms a guard for preventing grass, &c., from becoming tangled in the gearing. This wheel *d* engages with the teeth of a pinion spur-wheel, *d'*, on the forward end of a longitudinal shaft, *e*, which has its front bearing in a stirrup, E', of the hanger E, below the shaft *b'*, and its rear bearing in a hanger, F, which is bolted at its ends to the lower sides of the side beams of frame A, as shown in Figs. 1, 2, and 4.

The stirrup-bearing box E' is cast with the depressed hanger E, and a space is left above and on one side of this stirrup for gaining access to the bearing for lubricating it. By constructing this centrally-depressed hanger E E' as described, and supporting its extremities upon, instead of securing them to, the bottoms of the side beams of frame A, a very substantial support is afforded the two shafts b' and e; at the same time the hanger serves as a strong brace for said frame.

The rear end of the shaft e has an eccentric or crank wheel, f, keyed to it for communicating a reciprocating movement to the sickle g, through the medium of a pitman, g'. This pitman g' is attached to a box upon the wrist-pin of the wheel f in such manner as to admit of the adjustment of the front part of the cutting apparatus without causing a binding of the parts.

The finger-beam G is secured rigidly to the inner shoe, G', and this shoe is hinged at its rear end to the rear end of the drag-bar or brace H. The front end of this shoe G' is held between flanges on a fixed standard, h, which is bolted to the drag-bar, and which serves as a stay for the finger-beam against strain. The front end of the shoe G' is sustained upon the drag-bar H by means of an adjusting-screw, i, (see Fig. 2,) by means of which the front part of the cutting apparatus can be elevated or depressed, according to the height of cut required.

The upper brace, I, of the drag-bar H is secured at its rear end to the upper end of the standard-guide h, and at its front end it is secured to the bar H, and formed into an eye to receive the eyebolt or swivel-pin j, that passes through a hanger on the outer end of the front cross-beam of frame A.

The brace-bar J is pivoted at one end to a swivel that has its bearings on the bottom of the hanger F, and at the other end between two ears that are cast on the shoe G'. To this brace J a chain, k, is attached, which is again attached at its upper end to a slotted sector, l, that is fastened to the lever K, by which the cutting apparatus is raised or lowered. This lever is pivoted to a ratchet-plate and connected to this plate at any desired angle by means of a pawl, as shown in Fig. 2.

The driver's seat is mounted upon a box-frame, L, to which frame the lever c' is pivoted. This frame is hinged at its front end to the frame A, and may be thrown up out of the way when it is desired to have access to the mechanism below it.

Having thus described my invention, what I claim as new, and desire to secure by Letters Patent, is—

1. The construction of the hanger E with a depressed stirrup, E', which is open on all sides but one above the shaft e and below the shaft b, substantially in the manner and for the purpose described.

2. The combination of the hanger E, constructed with the open stirrup E' and the rear hanger, F, all constructed and arranged substantially as described.

3. Constructing the front hanger, E E', so that it can be attached to the top of the longitudinal beams A A, and at the same time will serve as a support for the two shafts e b, in the manner substantially as shown and described.

4. The hanger E and open stirrup E', cast in one piece, substantially as shown and described.

AMOS RANK.

Witnesses:
CHAS. E. DAVIS,
R. H. GARRIGUES.